US012629954B2

(12) United States Patent
Fuhse et al.

(10) Patent No.: US 12,629,954 B2
(45) Date of Patent: May 19, 2026

(54) OPTICALLY VARIABLE SURFACE PATTERN AND METHOD FOR PRODUCING SAME

(71) Applicant: GIESECKE+DEVRIENT CURRENCY TECHNOLOGY GMBH, Munich (DE)

(72) Inventors: Christian Fuhse, Otterfing (DE); Christian Stockl, Gmund a. Tegernsee (DE); Moritz Hofer, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 14 days.

(21) Appl. No.: 18/727,828

(22) PCT Filed: Jan. 11, 2023

(86) PCT No.: PCT/EP2023/025007

§ 371 (c)(1),
(2) Date: Jul. 10, 2024

(87) PCT Pub. No.: WO2023/135028

PCT Pub. Date: Jul. 20, 2023

(65) Prior Publication Data

US 2025/0100315 A1 Mar. 27, 2025

(30) Foreign Application Priority Data

Jan. 12, 2022 (DE) ..................... 10 2022 000 102.0

(51) Int. Cl.

*B42D 25/29* (2014.01)
*B42D 25/324* (2014.01)
*B42D 25/373* (2014.01)

(52) U.S. Cl.

CPC .......... *B42D 25/29* (2014.10); *B42D 25/324* (2014.10); *B42D 25/373* (2014.10)

(58) Field of Classification Search

CPC .... B42D 25/29; B42D 25/324; B42D 25/373; G02B 5/1809; G02B 5/1842; G02B 5/1847; G07D 7/0032; G07D 7/12; B44F 1/08

See application file for complete search history.

(56) References Cited

U.S. PATENT DOCUMENTS 9,140,834 B2 9/2015 Boegli
9,557,461 B2 1/2017 Lochbihler et al.
(Continued)

FOREIGN PATENT DOCUMENTS

DE 102011101635 A1 11/2012
DE 102012110630 A1 5/2014
(Continued)

OTHER PUBLICATIONS

German Search Report from corresponding DE Application No. 102022000102.0, Sep. 16, 2022.
(Continued)

*Primary Examiner* — Amara Abdi
(74) *Attorney, Agent, or Firm* — Workman Nydegger

(57) ABSTRACT

An optically variable surface pattern which is designed to provide a multi-color representation when viewed from at least one predefined viewing angle and includes a multiplicity of surface elements which are provided with relief structures, at least one of the relief structures having nanostructures that act as color filters. The relief structures are selected from a set of at least four relief structures that differ from one another, each of which generating a color impression corresponding to a predefined monochromatic color when viewed from the predefined viewing angle, and each of the monochromatic colors corresponding to a different basic color. The surface elements are dimensioned such that, in at least one subregion of the surface pattern, when viewed from the at least one predefined viewing angle, a color
(Continued)

impression corresponding to a mixed color that differs from the predefined basic colors can be generated.

16 Claims, 4 Drawing Sheets

(56) References Cited

U.S. PATENT DOCUMENTS

| | | | | |
|---|---|---|---|---|
| 10,926,570 | B2 | 2/2021 | Walter et al. | |
| 11,034,182 | B2 | 6/2021 | Fuhse et al. | |
| 2015/0362642 | A1* | 12/2015 | Nagano | G02B 5/08 359/567 |
| 2021/0268826 | A1* | 9/2021 | Yashiki | B42D 25/324 |
| 2021/0364686 | A1 | 11/2021 | Lim et al. | |
| 2022/0147780 | A1* | 5/2022 | Kagotani | G02B 5/0284 |
| 2023/0134765 | A1* | 5/2023 | Noudo | H10F 39/8067 382/124 |
| 2023/0347679 | A1* | 11/2023 | Godfrey | B42D 25/29 |
| 2024/0330635 | A1* | 10/2024 | Iino | B42D 25/324 |

FOREIGN PATENT DOCUMENTS

| | | | | |
|---|---|---|---|---|
| DE | 102016015335 | A1 | 6/2018 | |
| DE | 102017008918 | A1 | 3/2019 | |
| DE | 102017130589 | A1 | 6/2019 | |
| EP | 2336810 | A1 | 6/2011 | |
| EP | 3558691 | * | 11/2017 | B42D 25/328 |
| EP | 17804811 | * | 11/2017 | B42D 25/328 |
| WO | 2012156049 | A1 | 11/2012 | |

OTHER PUBLICATIONS

International Search Report from corresponding PCT Application No. PCT/EP2023/025007, May 2, 2023.
Barnes et al., "Photonic surfaces for surface-plasmon polaritons", Journal of the Optical Society of America A, vol. 14, No. 7, Jul. 1, 1997, pp. 1654-1661.
Gu et al., "Color generation via subwavelength plasmonic nanostructures", Nanoscale, The Royal Society of Chemistry, vol. 7, Mar. 13, 2015, pp. 6409-6419.
Zhao et al., "Artificial Structural Color Pixels: A Review", Materials, vol. 10 (8), Aug. 14, 2017, 18 pages.

* cited by examiner

OPTICALLY VARIABLE SURFACE PATTERN AND METHOD FOR PRODUCING SAME

BACKGROUND

The present invention relates to an optically variable surface pattern, in particular for an optically variable security element, wherein the surface pattern is designed to provide a multi-color representation when viewed from at least one predefined viewing angle. The invention further relates to a method for generating a surface pattern for providing a multi-color representation when viewed from at least one predefined viewing angle, in particular the surface pattern for the abovementioned security element. The invention also relates to an optically variable security element having the optically variable surface element mentioned above.

From the prior art, various optically variable security elements are known which are used to check for authenticity of an article provided therewith, for example a document of value or an identification document such as a banknote, a passport, a credit, bank, debit or identification card, etc. Optically variable security elements which have reproducible visual effects under specific viewing directions predefined by the structural structure of the security element are becoming more important, since they are generally difficult to reproduce and can thus implement efficient anti-counterfeiting protection.

For this purpose, optically variable security elements which provide a viewer with a representation in real color when viewed from one or more predefined viewing angles, for example a representation of a motif such as a portrait or a landscape, are known in particular. In particular for the representation of color images, two-dimensionally periodic, color-filtering gratings with nanostructures in the subwavelength range, which have color filter properties in the visible wavelength range, are known for example from WO 2012/156049. In addition, so-called "real-color holograms" are known, which generate the desired colors on the basis of gratings with period lengths in the range of the wavelength of the visible light when viewed from a prescribed viewing angle in the first order of diffraction.

Typically, such color representations are provided with the aid of three different, regularly arranged hologram or subwavelength gratings, which in the first and zero orders of diffraction respectively generate the basic colors red, green and blue and allow the generation of almost any colors by way of color mixing. The diffraction gratings are usually dimensioned and arranged in close proximity to one another in such a way that a viewer sees with the naked eye only the desired mixed color and can no longer resolve the individual regions which are occupied by diffraction gratings for the generation of the basic colors (red, green, blue).

Pixel-based RGB images can be generated, for example, by dividing each image point or each pixel into three subpixels for the basic colors red, green, and blue, which are more or less heavily occupied by the corresponding diffraction gratings, depending on the proportion of the mixed color to be generated. For example, to represent a pixel of the basic color red, the subpixel for generating the basic color red is maximally occupied, while the subpixels for generating the basic colors green and blue remain unoccupied. White pixels are generated by uniform color mixing of the basic colors red, green, and blue, whereas black pixels do not have diffraction gratings designed to scatter light into the first order of diffraction.

A serious disadvantage when generating multi-color representations based on this RGB color mix is that they are often very dark. This applies in particular to the representation of mixed colors that require a minimum or maximum proportion of the color components red, green, or blue.

Materials with nanostructures which act as color filters are also known from the prior art. In particular, reference is made to W. L. Barnes, S. C. Kitson, T. W. Preist, and J. R. Sambles, "Photonic surfaces for surface-plasmon polaritons," J. Opt. Soc. Am. A 14, 1654-1661 (1997); Yinghong Gu, Lei Zhang, Joel K. W. Yang, Swee Ping Yen and Cheng-Wei Qiu, "Color generation via subwavelength plasmonic nanostructures," Nanoscale, 2015, 7, 6409-6419, and Yuqian Zhao, Yong Zhao, Sheng Hu, Jiangtao Lv, Yu Ying, Gediminas Gervinskas and Guangyuan Si, "Artificial Structural Color Pixels: A Review," Materials 2017, 10 (8).

SUMMARY

It is the object of the present invention to propose a solution to the abovementioned problems. In particular, it is the object of the invention to provide a multi-color representation or a multi-color motif at least with the aid of nanostructures which act as color filters and which can be perceived by a viewer with a high brightness at a predefined or predefinable observation angle.

According to a first aspect of the present invention, an optically variable surface pattern is proposed, which is designed to provide a multi-color representation when viewed from at least one predefined viewing angle. The surface pattern comprises a multiplicity of surface elements which are provided with relief structures, at least one of the relief structures having a nanostructure acting as a color filter.

The optically variable effect of the surface pattern according to the invention or of a security element provided therewith can have different causes and is typically noticeable in a reproducible manner in dependence on the light incidence or the observation direction relative to the surface pattern. Within the scope of this invention, it is in particular those optical effects which are variable under the observation angle or light incidence and are caused by diffraction at the relief structures with nanostructures that are regarded as optically variable.

According to the invention, the relief structures are selected from a set of at least four different relief structures, which each generate a color impression corresponding to a predefined monochromatic color when viewed from the predefined viewing angle. This means that if the relief structures have a sufficiently large area, the light diffracted at the respective relief structure substantially in the direction of the predefined viewing angle would appear for a viewer in the monochromatic color which corresponds to a basic color and is assigned to the respective relief structure. Each of the monochromatic colors generated by the at least four relief structures of the set corresponds to a different basic color.

The surface elements provided at least in sections with the relief structures are dimensioned in such a way that a color impression which corresponds to a mixed color and deviates from the predefined basic colors can be generated in at least a subregion of the surface pattern when viewed from the at least one predefined viewing angle. In other words, the surface elements are dimensioned such that, when viewing the surface pattern from the predefined viewing angle, individual relief structures which correspond to different basic colors and are arranged in close proximity to one another cannot be resolved and the corresponding subregion appears for the viewer in a mixed color generated from the basic colors. The arrangement of the relief structures in the optically variable surface pattern is not fixedly predefined. Alternatively or in addition, a surface extent of the relief structures within the surface elements is also not fixedly predefined, for example limited to a minimum extent.

The fact that the arrangement of the relief structures in the optically variable surface pattern is not fixedly predefined should be understood to mean in particular in connection with the present invention that positions of the relief structures can be or are dynamically adapted to a predefined or desired multi-color representation, for example to a desired starting image. According to the invention, the arrangement of the relief structures in the optically variable surface pattern in this sense can be predefined dynamically variably and irregularly such that any desired multi-color representation is generated. In particular, the positioning of the relief structures is not limited by structural specifications, for example by minimum distances, grid arrangements or the like, but solely dependent on the desired multi-color representation or on the best possible reproduction thereof.

Furthermore, the fact that the surface extent of the relief structures within the surface elements is not fixedly predefined should be understood to mean in particular in connection with the present invention that the surface proportions that the relief structures occupy on a surface element can be or are dynamically adapted to a predefined or desired multi-color representation, for example to a desired coloration. According to the invention, the surface proportions of the relief structures in the optically variable surface pattern in this sense can be predefined dynamically variably and/or irregularly. In particular, the surface proportions of the relief structures are not limited by structural specifications, for example by minimum extents or the like, but solely dependent on the desired multi-color representation or on the best possible reproduction thereof. For example, the surface extents of the relief structures in relation to the area of the surface element can be set, for example, in dependence on a mixed color that is to be generated, which is contained in a desired color representation.

Preferably, the surface elements have a small spatial extent so that a desired mixed color can be generated by combining basic colors assigned to the respective relief structures. In advantageous configurations, each surface element occupies an area which is smaller than the surface content of a square having a side length of 200 μm, preferably 100 μm or 40 μm or less. In order to avoid unwanted color distortions due to diffraction effects at adjacent surface elements, these are significantly larger than the wavelength of visible light. Preferably, each surface element occupies an area which is larger than the surface content of a square having a side length of 1 μm or 5 μm, with particular preference 15 μm or more.

Depending on the basic colors selected, different achromatic or chromatic colors can be created. It has proved advantageous to select at least four monochromatic colors, also known as spectral colors, in order to be able to generate with a high brightness color representations that fully cover the color space.

Monochromatic colors, which for example are particularly suitable as basic colors, are in particular red, green, blue, cyan, magenta and/or yellow.

At least one, preferably all of the relief structures of the set has or have a nanostructure acting as a color filter for generating one of the monochromatic colors as a basic color. Particularly preferably, at least the relief structures provided for the monochromatic colors act as a color filter, which is predefined by the spatial and structural formation of the respective relief structure itself.

For generating the basic colors, the assigned relief structures preferably have nanostructures which act as color filters. Suitable structures are known from the scientific publications mentioned above. Reference is made only by way of example to plasmonic nanostructures in the subwavelength range, nanoantenna arrays, nanotube arrays (or nanohole arrays), photonic surfaces and/or photonic crystals. By adapting structural parameters, such as the structure depth, the arrangement of nanostructures relative to one another, in particular the distance or configuration of the nanostructures in the lateral plane of the surface element and/or perpendicular thereto, or the extent of the nanostructures relative to one another or similar measures, the color filtering properties can be modified in such a way that color filters acting in different spectral ranges are created.

According to some exemplary embodiments, the nanostructures of the relief structures which serve to generate monochromatic colors are formed as subwavelength structures, in particular as subwavelength gratings which are embossed into an otherwise planar substrate. Such structures generate colors that are usually particularly visible in mirror reflex, but are often dark and not particularly recognizable when viewed from other viewing angles. To increase the optimum viewing angle range, the color-giving subwavelength structures can be applied, for example, with an additional diffusing film or also advantageously to suitable other microstructures. In particular, it has been shown that an arrangement of the nanostructures or subwavelength structures on concave or convex carriers, for example cushion-shaped, lens-shaped or hemispherical carriers, leads to a significantly larger viewing angle range from which the desired colors can be seen well.

Preferably, at least one of the relief structures of the set for generating one of the monochromatic colors has periodic nanostructures having a period of between 10 nm and 500 nm, preferably between 50 nm and 400 nm, and particularly preferably between 100 nm and 350 nm.

According to some advantageous configurations, at least one of the relief structures or each of the relief structures is provided with a metallic coating. The metallic coating may, for example, be an aluminum layer with a thickness of a few nanometers, in particular about 60 nm. Preferably, the motif of the optically variable surface pattern is represented in reflection using relief structures with metallized nanostructures in the subwavelength range. The subwavelength range is defined in particular with reference to the visible spectrum of light and thus typically refers to wavelengths of less than 400 nm.

According to some advantageous configurations of the invention, the nanostructures or subwavelength structures can also be applied to micromirrors, with the result that the corresponding generated basic color is best visible in each case from a direction predefined by the orientation of the micromirrors. If all the micromirrors are oriented in the same way, the motif to be represented or the real-color representation lights up at a specific angle, which depends on the orientation of the micromirrors. In particular, tilting images can also be generated, for example when two differently oriented arrangements of micromirrors are finely interleaved and the micromirrors of the different arrangements contain nanostructures for generating two different motifs or real-color images. Real-color tilting images can also be generated with lens-shaped structures (e.g. spherical lenses or rod lenses), for example when different nanostructures which serve to represent different motifs or real-color images are superimposed in each case on the top or bottom of each lens structure. Advantageously, the lens grid and the grid of the image elements or pixels of the real-color image here match or are integer multiples of one another (e.g., the grid width of the image elements/pixels of the RGB real-color image is twice as large as the grid width of the lens grid), for example to avoid potentially disturbing moiré effects.

In connection with the present invention, the term pixel is not to be understood restrictively to the usual meanings of the term, but generally designates a picture element or an image point in any design, for example depending on the application scenario of the surface patterns according to the invention.

Preferably, at least one of the relief structures of the set for generating one of the monochromatic colors as a basic color is designed on the basis of plasmonic effects.

Preferably, the set of relief structures also includes those for generating achromatic colors as basic colors. Particularly preferably, the set contains at least one further relief structure for generating the basic color black. Alternatively or in addition, the set preferably contains at least one further relief structure for generating the basic color white.

According to some exemplary embodiments, the relief structure designed for generating the basic color black comprises aperiodically arranged moth eyes and/or periodic nanostructures in the subwavelength range, which appear dark.

According to some exemplary embodiments, the relief structure designed for generating the basic color white comprises at least one reflective planar surface and/or at least one diffusing structure. In other words, in the relief structure designed for generating the basic color white, nanostructures can be dispensed with and can be replaced in particular by simple reflective surfaces, provided that the representation of the motif takes place in reflection.

Preferably, the predefined viewing angle at which the respective relief structures generate the basic colors corresponds to the zero order of diffraction.

According to some advantageous embodiments, the relief structures for generating the basic colors, in particular the abovementioned monochromatic colors red, green, blue, cyan, magenta and/or yellow and/or the achromatic colors black and/or white, are provided with appropriately acting nanostructures. Thus, differently nanostructured relief structures generate the desired basic colors when viewed from the predefined observation angle, so that in particular a color impression which corresponds to a mixed color generated from the basic colors can be generated.

Preferably, the surface pattern is designed for the representation of a true color image. In the context of this invention, the term "real-color image" or "real-color" is to be understood with reference to the color space, which is spanned by the basic colors that can be generated by the relief structures when viewed from the predefined observation angle. The size of the color space therefore depends, among other things, on the number of basic colors, which corresponds to the number of relief structures that generate the basic colors. In addition, the choice of the basic colors and of the design of the relief structures, such as their coating, also has a particular influence on the color space defined in this way.

Preferably, the number of relief structures of the set is greater than four, particularly preferably eight or more. This ensures that a true-color image that uses a large color space can be represented in detail. In possible configurations, achromatic colors, especially black and/or white, are selected as additional basic colors. As an alternative or in addition, further chromatic colors, such as red, green, blue, cyan, magenta and/or yellow, are selected as the basic colors. In particular for the representation of motifs from the RGB color space, advantageous embodiments make provision for the colors corresponding to the vertices of the "RGB cube" to be taken into account and thus to provide according to exemplary embodiments red, yellow, green, black, magenta, white, cyan and blue as the basic colors.

Preferably, the set contains at least four, particularly preferably five or more relief structures which generate such different monochromatic colors.

Particularly preferably, the set of relief structures contains in each case at least one, in particular exactly one, relief structure which is designed for generating one of the monochromatic colors red, green, blue, cyan, magenta and yellow as the basic color. Preferably, two relief structures for generating the achromatic colors are provided, and six relief structures for generating the monochromatic colors are provided.

According to a second aspect of the present invention, a method for generating a surface pattern for providing a multi-color representation when viewed from at least one predefined viewing angle is proposed, which according to the invention comprises the following steps:

- selecting a set of at least four different relief structures, each generating a color impression corresponding to a predefined basic color when viewed from at least one predefined viewing angle, wherein the at least four relief structures of the set are designed to generate monochromatic colors as basic colors. At least one of the relief structures designed for generating one of the monochromatic colors has a nanostructure acting as a color filter.
- providing a starting image comprising starting pixels. At least one starting pixel is of a color that deviates from the predefined basic colors,
- calculating an approximation image having a multiplicity of pixels, which corresponds to a pixel-wise approximation of the starting image, wherein the pixels of the approximation image are assigned a color that can be generated by the basic colors;
- generating a pixel-based, optically variable surface pattern with a multiplicity of surface elements, wherein the surface elements are assigned to the pixels of the approximation image and at least in sections are provided with the relief structures in such a way that a color impression generated by the surface elements when viewed from the predefined viewing angle corresponds to the color of the pixel of the approximation image assigned to the respective surface element.

A corresponding surface pattern is comparatively easy to generate in terms of production technology, since only comparatively few different relief structures are used for representing a color motif. Since relief structures for generating the achromatic colors black and white are always provided, a sufficient brightness and, based on the underlying color space, good true-color reproduction can be ensured.

The optically variable surface pattern is generated according to the invention in accordance with the starting image to be represented, wherein the approximation image is calculated as an approximation of the starting image in such a way that it contains colors that can be generated by the basic colors. Once the approximation image is available, practically all the information for generating the corresponding surface pattern is available. The associated relief structures, which are necessary for the reproduction of the color design of the respective pixels of the approximation image, can be generated, for example, by means of electron beam lithography. For mass production, a lithographically generated master in particular can be molded and duplicated several times. The nanostructured relief structures or nanostructures can, for example, be transferred to an embossing tool and thus be embossed on film in an embossing lacquer. Preferably, such embossed structures are then provided with a metallization and/or provided with a high-refractive coating to obtain the desired color effect.

In general, relief structures can be arranged at different positions within individual surface elements. The extent of the relief structures is also not fixedly predefined. For example, individual surface elements may thus be provided with relief structures only in regions.

Preferably, the set contains additional relief structures for generating achromatic basic colors, in particular black and/or white.

In advantageous configurations, a dithering algorithm, in particular an error-diffusion algorithm, such as a Floyd-Steinberg-dithering is applied to the color values contained in the starting pixels of the starting image in the calculation of the approximation image. The colors of the pixels of the approximation image are thus preferably determined taking into account the dithering algorithm, for example, in accordance with a minimum distance in the color space.

According to some advantageous configurations of the method, in the calculation of the approximation image, each pixel is assigned exactly one basic color, for example, in accordance with a minimum distance in the color space. For example, the basic color that has the shortest distance from the color of the pixel in the color space can thus be selected. For generating the surface pattern, it is then sufficient to assign each pixel of the approximation image a corresponding surface element and to provide the latter with the relief structure corresponding to the corresponding basic color.

Preferably, at least one of the pixels has a color which deviates from the basic colors and is assigned to one of the surface elements which has at least two subregions that are provided or are to be provided with relief structures. The approximation image may in preferred configurations be present in particular as an RGB data set. In particular, it is proposed to effect the desired color design of the surface elements of the surface pattern by providing three or four subregions, which are formed with relief structures which correspond to different basic colors.

Preferably, the desired color design is effected by means of surface elements with subregions of variable size. In order to effect a color design adapted to the assigned pixel of the approximation image, the assigned surface element is divided into subregions, the size of which depends in particular on the color of the pixel. In such configurations, a surface portion of at least one of the subregions of the assigned surface element is determined, in particular in relation to the area of the assigned surface element, in accordance with the color of the assigned pixel in the approximation image.

A third aspect relates to an optically variable security element with the optically variable surface pattern according to the invention.

BRIEF DESCRIPTION OF THE DRAWINGS

Further aspects, features and advantages of the present invention will be evident from the following detailed description of preferred embodiments and embodiment variants of the present invention with reference to the attached figures, in which.

DETAILED DESCRIPTION OF VARIOUS EMBODIMENTS

The invention will be explained below by way of example with reference to the drawings illustrating specific exemplary embodiments of the invention. These exemplary embodiments are described in detail and allow a person skilled in the art to technically implement the invention. The embodiments described are not mutually exclusive but rather supplement one another. To this extent a specific feature, a specific structure or a specific property described in relation to one embodiment can also be implemented in relation to other embodiments without deviating from the subject matter of the invention. Furthermore, the position or arrangement of individual elements or steps within the described embodiments can be modified of course without deviating from the subject matter of the invention. For this reason, the following description of the attached figures should not be understood to be restrictive because the scope of the invention is defined only by the attached claims and also comprises variants and equivalents, which will not be expressly described below.

Figure 5:
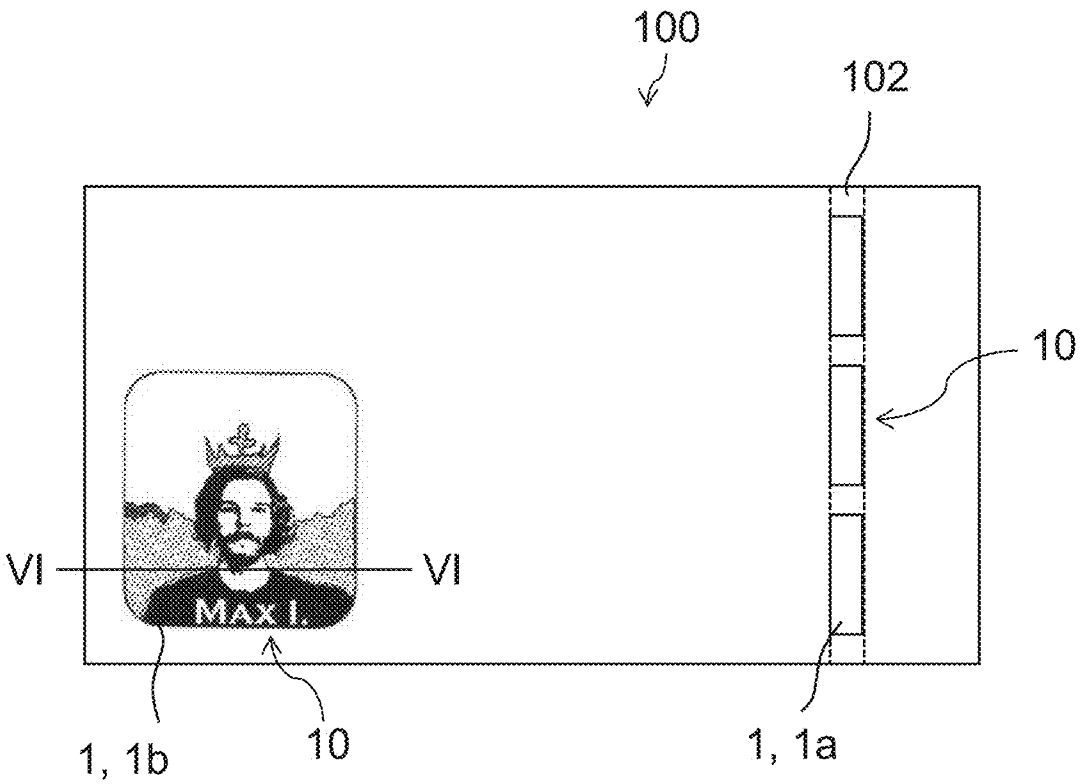
FIG. 5 shows a valuable object secured with an optically variable security element.

FIG. 5 shows schematically in plan view an exemplary document of value 100 secured with optically variable security elements 1, 1*a*, 1*b*, in the form of a banknote. For this purpose, the security elements 1 are embedded in the carrier material of the banknote. The security element 1 in the form of a security thread 1*a* is a film element, which is embedded in the banknote in a common manner in such a way that sections thereof are covered by paper bridges 102 and it thus forms a window thread, which emerges here at the surface on the visible side of the document of value 100. Alternatively, the security thread 1*a* may alternately appear in alternation on opposite sides of the document of value 100. FIG. 5 further shows an optically variable security element 1 in the form of a film patch 1*b*, which shows a portrait. For example, the film patch 1*b* can be applied completely on a surface of the document of value 100 and be visible there. The optically variable security element 1 has an optically variable surface pattern 10, which is schematically illustrated in FIG. 1.

Figure 6:
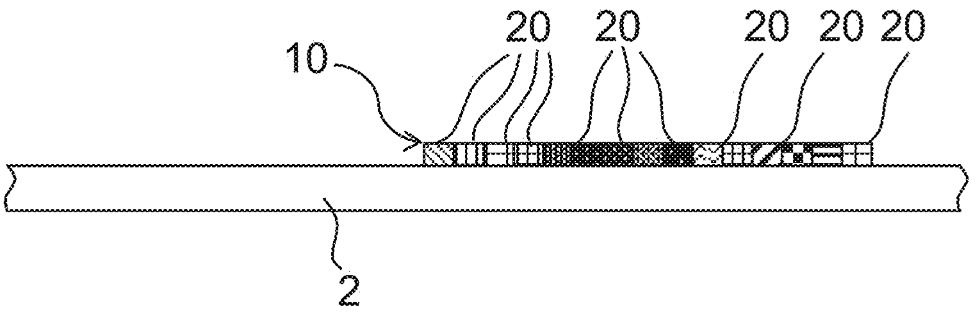
FIG. 6 shows an optically variable security element having a surface pattern of, for example, FIG. 1.

As illustrated by way of example in FIG. 6 along the section line VI-VI of FIG. 5, the security element 1 has on one side a surface pattern 10 which is formed from a multiplicity of surface elements 20 provided with relief structures. The surface pattern 10 is formed on one side on a planar substrate 2, which is formed, for example, from a film, preferably of polyethylene terephthalate. The substrate 2 is covered by a plurality of surface elements 20. The surface pattern 10 or the surface elements 20 have at least four different, nanostructured surface elements 20 for generating at least four monochromatic colors.

Figure 1:
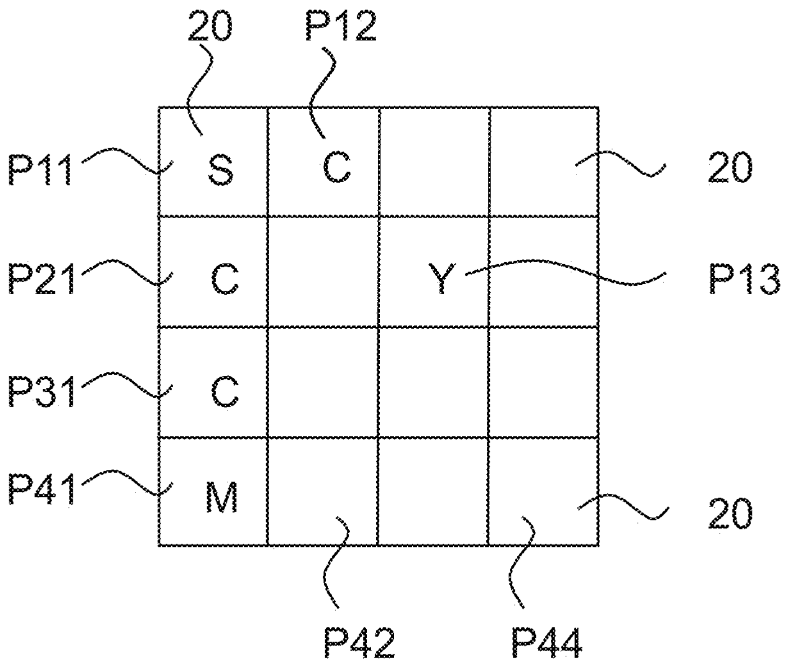
FIG. 1 shows an arrangement of surface elements of a surface pattern of an optically variable surface pattern.

FIG. 1 shows schematically a section of the optically variable surface pattern 10 of the security element 1 according to an exemplary embodiment of the invention. The security element 1 typically has a flat substrate (not shown in more detail) on which the surface pattern 10 is applied or in which the surface pattern 10 is incorporated. Provision is made for surface pattern 10 to be formed so as to provide in particular a predefined motif in real color when viewed from a predefined observation angle in reflection or in transmission.

FIG. 1 shows, for example, a reflective surface pattern 10 with a multiplicity of surface elements 20 arranged side by side and among themselves in a grid form, which surface elements are designed for the provision of a representation, for example of a multi-color motif, when viewed from a predefined observation angle with the aid of nanostructures in the subwavelength range acting as color filters. The substantially square surface elements 20 are provided for this purpose (in a manner which is not illustrated in more detail) at least in sections with relief structures comprising periodic nanostructures in particular for representing a monochromatic color or an achromatic color in the zero order of diffraction. Alternatively, nanostructures can be dispensed with for representing the achromatic color white and for example the relief structure formed for this purpose can be designed as a reflective planar area and/or as a diffusing structure, in particular without periodic nanostructure.

In the exemplary embodiment of FIG. 1, each surface element 20 is assigned exactly one relief structure from a set of a total of eight relief structures, each of which serves to generate one of eight basic colors. This set contains here the achromatic colors black and white as well as six further monochromatic colors or spectral colors as basic colors.

In deviation, for example, a set of only four relief structures can be provided, which serves to generate four monochromatic colors as the basic colors. Such a restricted set of relief structures is particularly suitable for the representation of a motif which fully exploits an assigned color space, for example a section of the RGB color space. The specific choice of the monochromatic colors as basic colors is in principle not subject to any restriction and is advantageously carried out in such a way that the color space necessary for the representation is set up and the colors contained in the representation preferably have a small distance at least from one mixed color which can be generated by the selected basic colors in particular using additive mixing.

In particular, the monochromatic colors red (R), green (G), blue (B), cyan (C), magenta (M) and/or yellow (Y) are provided as basic colors, which in the RGB color space with 3×8=24 bit color depth are correspondingly characterized for example by the RGB components red (255, 0, 0), green (0, 255, 0), blue (0, 0, 255), cyan (0, 255, 255), magenta (255, 0, 255) and/or yellow (255, 255, 0). This selection of basic colors thus corresponds to the vertices of what is known as the "RGB cube" representing or setting up the linear RGB color space.

The assigned relief structures have nanostructures which act as color filters, at least for the generation of monochromatic colors as basic colors. In the illustrated exemplary embodiment, red R, green G, blue B, cyan C, magenta M, yellow Y, black S, and white W are provided as the basic colors.

The surface pattern 10 of the first exemplary embodiment is formed by a grid of substantially square surface elements 20 with an edge length of 20 μm.

In the exemplary configuration according to FIG. 1 shown, which should not be considered in a restricting manner, the surface element 20 at position P11 is provided with the relief structure assigned to the basic color black S. The surface elements 20 at positions P12, P21 and P31 are each provided with the relief structure assigned to the basic color cyan C. The surface element 20 at position P13 is provided with the relief structure assigned to the basic color yellow Y, the surface element 20 at position P41 is provided with the relief structure assigned to the basic color magenta M, and the surface element 20 at position P42 is provided with the relief structure assigned to the basic color white W. It is understood that the color design of the surface pattern 10 depends on the motif to be represented, and thus that generally each surface element 20 can also be provided with relief structures merely only in subregions that correspond to the selected basic colors of the set. In this sense, the arrangement of the relief structures in the surface pattern or the surface extent of the subregions of each surface element which are provided with relief structures can be variably predefined. The arrangement of the surface patterns and their extents therefore depends solely on the desired multi-color representation or on the best possible reproduction thereof and is not restricted by structural specifications, such as grid arrangements, minimum distances, minimum extents or the like.

Figure 2:
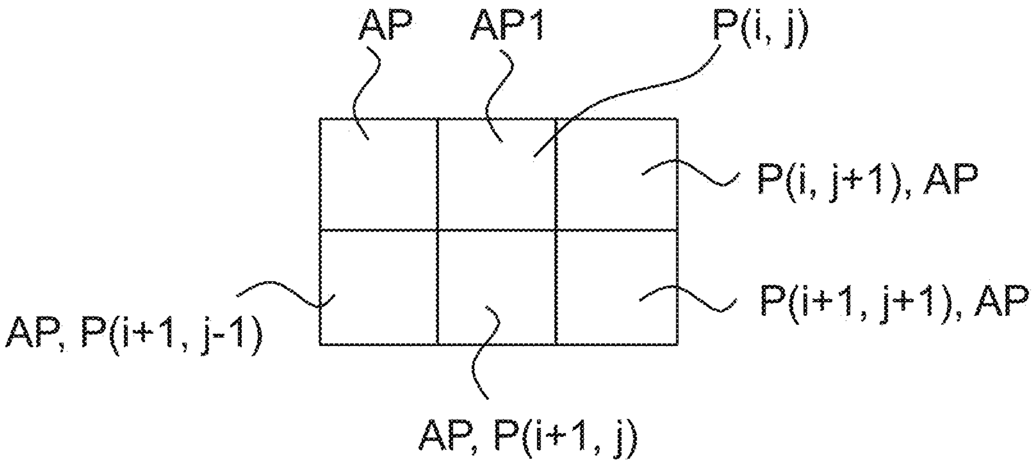
FIG. 2 shows a method for generating a surface pattern in accordance with a starting image to be represented, wherein an approximation image is assigned exactly one basic color.

FIG. 2 illustrates a method for generating a surface pattern 10 by way of example in accordance with a pixel-based starting image A to be represented with starting pixel AP in the RGB color space. For each starting pixel AP of the starting image A, starting with a first starting pixel AP1, in each case that basic color of the predefined, in particular eight, basic colors is determined whose color value has the lowest color distance from the color value of the first starting pixel AP1. The color value of the corresponding basic color is assigned to a first pixel of an approximation image, which represents an approximation of the starting image. The error contribution or the deviation of the color value of the basic color from the color value of the first starting pixel AP1 is assigned to the surrounding starting pixels according to a defined scheme, in particular according to a dithering algorithm, an error diffusion algorithm or in particular a Floyd-Steinberg dithering.

In the example shown in FIG. 2, the color values of the starting pixels AP which are adjacent to the first starting pixel AP1 are assigned fixed fractions, in particular 7⁄16, 3⁄16, 5⁄16 and 1⁄16 of the error contribution, with the result that this error contribution is taken into account in the assignment of the basic color of the remaining starting pixels AP. This procedure is performed in columns and rows for each starting pixel AP, wherein error contributions from different starting pixels are summed up so that they are taken into account when assigning the color values of the pixels of the approximation image in accordance with the minimum distance in the color space. In this way, an approximation image approximating the starting image is created, the pixel of which is always assigned to one of the basic colors.

The first starting pixel AP1 at the position P(i,j), where i indicates the rows and j the columns of the pixel grid of the starting pixels AP, is thus assigned a basic color in accordance with the smallest distance. The error contribution F, i.e. the color deviation of the color value of the first starting pixel at the position P(i,j) from the basic color, is assigned to the color value of the surrounding starting pixels at fixed fractions. In particular, the starting pixel AP at the position P(i, j+1) is assigned a color value that corresponds to the sum of the previous color value and 7/16 of the error contribution. The starting pixel AP at the position P(i+1, j−1) is assigned a color value that corresponds to the sum of the previous color value and 3/16 of the error contribution, the starting pixel AP at the position P(i+1, j) is assigned a color value that corresponds to the sum of the previous color value and 5/16 of the error contribution, and the starting pixel AP at the position P(i+1, j+1) is assigned a color value that corresponds to the sum of the previous color value and 5/16 of the error contribution.

Subsequently, a basic color is assigned to the starting pixel AP at the position P(i, j+1) in accordance with the lowest color distance in the color space, and the error contribution is assigned to the directly adjacent starting pixels according to the above-described scheme. This procedure is performed for all starting pixels AP of one row i and then correspondingly for all starting pixels AP of the next row i+1, wherein error contributions from different starting pixels are summed up.

In this way, an approximation image is obtained, which represents an approximation to the starting image, with pixels that are clearly assigned to one of the basic colors that can be generated by the relief structures.

The optically variable surface pattern 10 is then generated by assigning the surface elements 20 to the pixels of the approximation image and providing the surface elements 20 with nanostructured relief structures which correspond to the basic colors to be generated of the respectively assigned pixels of the approximation image.

Figure 3:
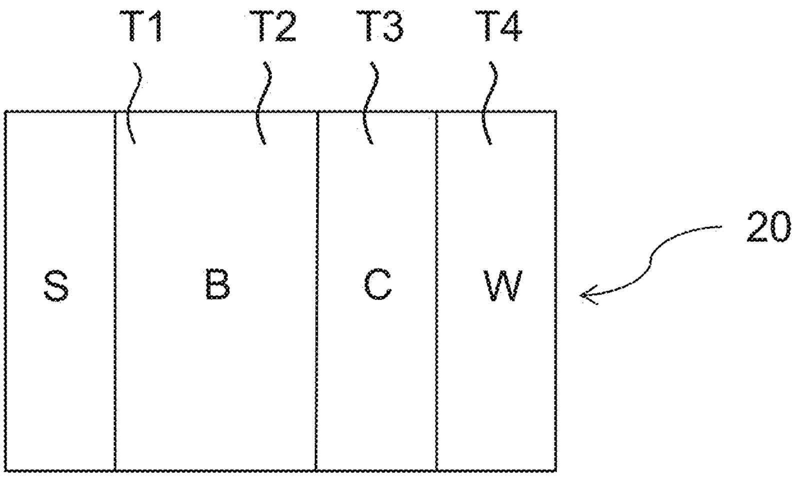
FIG. 3 shows a surface element with subregions having relief structures, the size of which is selected depending on the color of a pixel of an approximation image assigned to the surface element.

FIG. 3 shows for example a surface element 20, which has four subregions T1, T2, T3, T4, which are provided with different relief structures for generating different basic colors. FIG. 3 can equally be regarded as a realization of a surface element 20 which represents an approximation of a starting pixel of a starting image or pixel of the approximation image of any color. The surface element 20 is divided into the subregions T1, T2, T3, T4 in accordance with the color of the starting pixel assigned to the surface element 20, which in this example does not correspond to a basic color but to a color that can be generated by mixing the basic colors. This color can be generated in particular by subpixels of the starting pixel. In this exemplary embodiment, the colors red (R), green (G), blue (B), cyan (C), magenta (M), yellow (Y), black(S), and white (W) are also selected as basic colors.

Without limiting the general applicability, it should be assumed that the color of the starting pixel to be represented is given by the red component r, the green component g, and the blue component b in the RGB color space. In an RGB color space with a 24-bit color depth, the red component r, the green component g, and the blue component b are each given by an integer value of between 0 and 255.

For illustration purposes and without limiting the general applicability, it is also assumed for the color of the starting pixel that:

$$r \leq g \leq b.$$

In order to now specify a surface element 20 which has a coloration corresponding to the color of the starting pixel, for example the colors black (0, 0, 0), blue (0, 0, 255), cyan (0, 255, 255), and white (255, 255, 255) are selected as the basic colors.

In this example, the subregion T1 is provided with the relief structure corresponding to the basic color black S, the subregion T2 is provided with the relief structure corresponding to the basic color blue B, the subregion T3 is provided with the relief structure corresponding to the basic color cyan C, and the subregion T4 is provided with the relief structure corresponding to the basic color white W. The relative surface portion F1 of the subregion T1 in relation to the area of the surface element 20 is determined by the relation F1=(255−b)/255, where b is the blue component of the starting pixel. Accordingly, the relative surface portion F2 of the subregion T2 in relation to the area of the surface element 20 is determined by the relation F2=(b−g)/255, the relative surface portion F3 of the subregion T3 in relation to the area of the surface element 20 is determined by the relation F3=(g−r)/255, and the relative surface portion of the subregion T4 in relation to the area F4 of the surface element 20 is determined by the relation F4=r/255, where b is the blue component, g is the green component and r is the red component of the starting pixel.

This division of the subregions T1, T2, T3, T4 generates the desired color of the assigned starting pixel averaged over the entire surface element. For detection purposes, the average hue generated can be calculated from the four basic colors used weighted with the respective relative surface portions F1 to F4:

| | | | |
|---|---|---|---|
| Subregion T1 | black subpixel | (255 − b)/255 * (0, 0, 0) = | (0, 0, 0) |
| Subregion T2 | blue subpixel | (b − g)/255 * (0, 0, 255) = | (0, 0, b − g) |
| Subregion T3 | cyan subpixel | (g − r)/255 * (0, 255, 255) = | (0, g − r, g − r) |
| Subregion T4 | white subpixel | r/255 * (255, 255, 255) = | (r, r, r) |
| | | | Σ = (r, g, b) |

It should be noted that this method can be carried out analogously, even if the abovementioned condition r≤g≤b has not been met. In this case, two other monochromatic colors may need to be selected as the basic colors of the set for the subregions T1, T2, T2, T4. In general, it is always those monochromatic colors of the basic colors red (R), green (G), blue (B), cyan (C), magenta (M), yellow (Y) that have the smallest distance from the color of the assigned pixel of the approximation or starting image that need to be selected. The achromatic colors black(S) and white (W) are additionally preferably selected as basic colors.

This method can be used to generate any color with, for example, four subregions of the surface element, which are each provided with relief structures. It may be the case here that individual surface portions are zero, i.e. that, depending on the hue to be generated, surface elements with only three or fewer structured subregions may also be provided. This is true in particular if the pixel of the starting or approximation image is of a color that corresponds to one of the basic colors.

Figure 4:
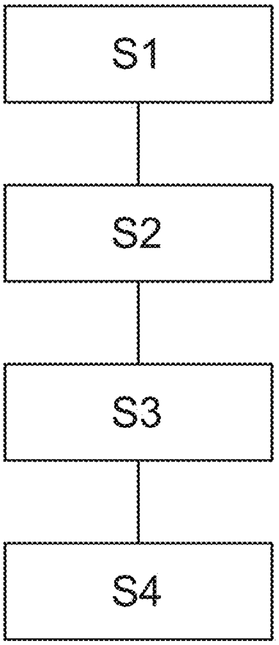
FIG. 4 shows a schematic sequence of steps illustrating a method according to the invention for generating a surface pattern.

FIG. 4 illustrates the steps of a method according to the invention for generating a surface pattern 10 in the form of a schematic overview, wherein the individual steps have already been described in detail in connection with FIGS. 1 to 3. According to a step S1, a set of at least four relief structures is selected in the manner described above, so that they create a color impression corresponding to a predefined basic color R, G, B, C, M, Y. According to a step S2, a starting image with at least one starting pixel AP which deviates from the predefined basic color is provided. According to a step S3, an approximation image is calculated as a pixel-wise approximation of the starting image, the pixels of which are assigned a color that can be generated by the basic colors. According to a step S4, a pixel-based, optically variable surface pattern 10 is finally generated, the surface elements 20 of which are assigned to the pixels of the approximation image and are provided at least in sections with the relief structures in the manner described above. The color impression generated by the respective surface elements 20 then corresponds to the color of the respectively assigned pixel of the approximation image.

Figure 4A:
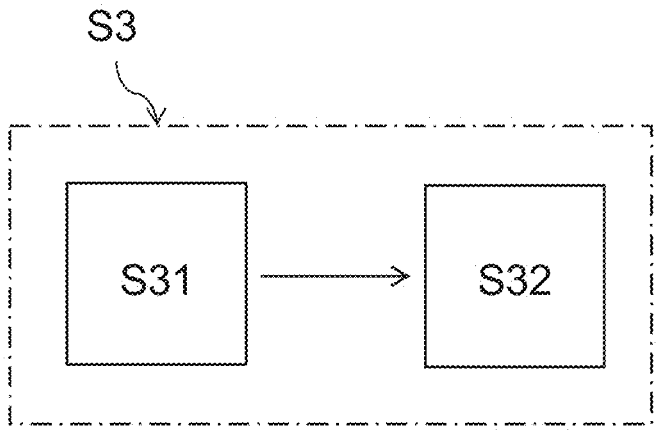
FIG. 4*a* shows a first method variant of the method according to FIG. 4 for generating the surface pattern using a dithering algorithm.

According to a variant of the method according to FIG. 4, illustrated in FIG. 4*a*, a dithering algorithm, in particular an error diffusion algorithm, such as a Floyd-Steinberg dithering, is applied in an approximation step S31 to color values contained in the starting pixels AP of the starting image in the calculation of the approximation image in step S3. Subsequently, each pixel is assigned exactly one basic color in a further approximation step S32 in accordance with a minimum distance in the color space. In this respect, reference is made to the above description with reference to FIG. 2.

Figure 4B:
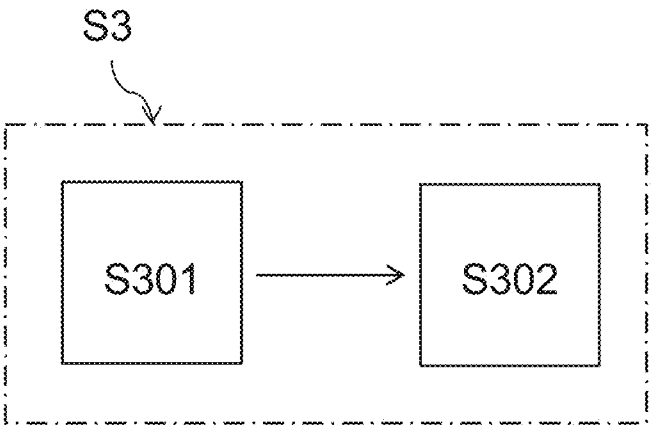
FIG. 4*b* shows a second variant of the method according to FIG. 4 for generating the surface pattern using surface elements with substructures, in particular subpixel structures, realized in subregions.

According to a further variant of the method illustrated in FIG. 4, illustrated in FIG. 4*b*, at least one starting pixel has a color that deviates from the basic colors in the calculation of the approximation image in step S3. This color is assigned in an approximation step 301 to one of the surface elements 20 which has at least two subregions provided with relief structures (see, to this end, in particular FIG. 3). A surface portion of at least one of the subregions T1, T2, T3, T4 of the assigned surface element, in particular in relation to the area of the assigned surface element, is determined in a further approximation step S302 in accordance with the color of the assigned pixel, as already explained in particular with reference to FIG. 3. If necessary, steps S301, S302 are repeated for all starting pixels or pixels of the approximation image that have a coloration that deviates from the basic colors.

The above description discloses the invention with reference to specific embodiments. However, it is possible within the scope of the claims in question to deviate from the components, elements, and process sequences described herein without departing from the subject matter of the present invention. The description and the drawings can be understood to be therefore illustrative but not restrictive.

The above description discloses the invention with reference to specific embodiments. However, it is possible within the scope of the claims in question to deviate from the components, elements, and process sequences described herein without departing from the subject matter of the present invention. The description and the drawings can be understood to be therefore illustrative but not restrictive.

The invention claimed is:

1. An optically variable surface pattern, which is designed to provide a multi-color representation when viewed from at least one predefined viewing angle, wherein the surface pattern comprises a multiplicity of surface elements which are provided with relief structures, wherein at least one of the relief structures has a nanostructure acting as a color filter, wherein the relief structures are selected from a set of at least four different relief structures, which each generate a chromatic color impression corresponding to a predefined monochromatic color when viewed from the predefined viewing angle, wherein each monochromatic color corresponds to a different basic color, wherein the surface elements are dimensioned such that, in at least one subregion of one of the surface elements and/or of the surface pattern, a color impression that deviates from the predefined basic colors and corresponds to a mixed color can be generated when viewed from the at least one predefined viewing angle, wherein an arrangement of the relief structures in the optically variable surface pattern and/or a surface extent of the relief structures within the surface elements is not fixedly predefined.

2. The optically variable surface pattern according to claim 1, wherein the relief structures are arranged in the optically variable surface pattern dynamically variably and/or irregularly and/or solely dependent on the multi-color representation and/or not limited by structural specifications, such as minimum distances or grid arrangements; and/or the relief structures within the surface elements have surface extents which are dynamically variable and/or irregular and/or solely dependent on the multi-color representation and/or not limited by structural specifications, for example by minimum extents in such a way that any desired multi-color representation is provided.

3. The optically variable surface pattern according to claim 1, wherein at least one of the relief structures of the set for generating one of the monochromatic colors as the basic color has a nanostructure acting as a color filter.

4. The optically variable surface pattern according to claim 1, wherein at least one of the relief structures of the set for generating one of the monochromatic colors has periodic nanostructures with a period of between 10 nm and 500 nm.

5. The optically variable surface pattern according to claim 1, wherein at least one of the relief structures of the set for generating one of the monochromatic colors is formed on a basis of plasmonic effects.

6. The optically variable surface pattern according to claim 1, wherein the set contains at least one further relief structure for generating a black non-chromatic basic color, wherein the relief structure designed for generating the black non-chromatic basic color comprises a periodically arranged moth eyes and/or periodic nanostructures in a subwavelength range which appear dark.

7. The optically variable surface pattern according to claim 1, wherein the set contains at least one further relief structure for generating a white non-chromatic basic color, wherein the relief structure designed for generating the white non-chromatic basic color comprises at least one reflective planar surface and/or at least one diffusing structure.

8. The optically variable surface element according to claim 1, wherein the predefined viewing angle at which the respective relief structures generate the basic colors corresponds to a zero order of diffraction.

9. The optically variable surface element according to claim 1, wherein at least one of the relief structures or each of the relief structures are provided with a metallic coating and/or the surface pattern is designed for representing a true color image.

10. The optically variable surface element according to claim 1, wherein the number of relief structures of the set is greater than four.

11. The optically variable surface element according to claim 1, wherein the set of relief structures each contains at least one relief structure which is designed for generating the monochromatic colors red, green, blue, cyan, magenta and yellow as the basic color.

12. A method for generating a surface pattern for providing a multi-color representation when viewed from at least one predefined viewing angle, wherein the method comprises:

selecting a set of at least four different relief structures, each generating a chromatic color impression corresponding to a predefined basic color when viewed from at least one predefined viewing angle, wherein the at least four relief structures of the set are designed to generate monochromatic colors as basic colors, wherein at least one of the relief structures designed for generating one of the monochromatic colors has a nanostructure acting as a color filter, providing a starting image comprising starting pixels, wherein at least one of the starting pixels is of a color that deviates from the predefined basic colors, calculating an approximation image having a multiplicity of pixels, which corresponds to a pixel-wise approximation of the starting image, wherein the pixels of the approximation image are assigned a color that can be generated by the basic colors;

generating a pixel-based, optically variable surface pattern with a multiplicity of surface elements, wherein the surface elements are assigned to the pixels of the approximation image and at least in sections are provided with the relief structures in such a way that a color impression generated by the surface elements when viewed from the predefined viewing angle corresponds to the color of the pixel of the approximation image assigned to the respective surface element.

13. The method according to claim 12, wherein the set comprises a further relief structure for generating a white color as a non-chromatic basic color and/or a further relief structure for generating a black color as a further non-chromatic basic color.

14. The method as according to claim 12, wherein a dithering algorithm, in particular an error diffusion algorithm, such as a Floyd-Steinberg-dithering, is applied to color values contained in the starting pixels of the starting image in the calculation of the approximation image.

15. The method according to claim 12, wherein in the calculation of the approximation image, each pixel is assigned exactly one basic color.

16. The method according to claim 12, wherein at least one pixel is of a color that deviates from the basic colors and is assigned one of the surface elements which has at least two subregions provided with relief structures, wherein a surface portion of at least one of the subregions of the assigned surface element is determined, in particular in relation to an area of the assigned surface element, in accordance with the color of the assigned pixel.

* * * * *